United States Patent

Gaon et al.

[15] 3,647,991

[45] Mar. 7, 1972

[54] PROGRAMMED TIME-RESPONSIVE AUDIO MESSAGE AND REMINDER DEVICE

[72] Inventors: Bernard Gaon, Santa Ana; Stuart Goldfarb; Adrienne R. Goldfarb, both of Los Angeles, all of Calif.

[73] Assignee: said Stuart J. Goldfarb, by said Gaon

[22] Filed: June 23, 1969

[21] Appl. No.: 835,561

[52] U.S. Cl. .................................179/100.2 S, 179/100.1 C

[51] Int. Cl. .......................................................G11b 15/06

[58] Field of Search ...........179/100.2 S, 100.2 MI, 100.1 PS, 179/100.1 TC, 100.1 UC, 100.1 C; 340/174.1 A, 174.1 K, 147 P

[56] References Cited

UNITED STATES PATENTS

| | | | |
|---|---|---|---|
| 2,641,654 | 6/1953 | Offutt | 179/100.1 PS |
| 2,780,679 | 2/1957 | Vandivere | 179/100.2 S |
| 2,995,630 | 8/1961 | Kabrick et al. | 179/100.2 MI |
| 2,561,602 | 7/1951 | Valentino et al. | 179/100.2 S |
| 3,505,485 | 4/1970 | Andrews | 179/100.2 S |

*Primary Examiner*—Stanley M. Urynowicz, Jr.
*Assistant Examiner*—Alfred H. Eddleman
*Attorney*—Miketta, Glenny, Poms and Smith

[57] ABSTRACT

A time-responsive audio programmed message and/or reminder device which includes a tape recording and playback apparatus, a timing device for selective periodic operation of the tape recording and playback device and a recording time selection apparatus enabling the tape to be selectively programmed to deliver an audio message at a predetermined time.

5 Claims, 1 Drawing Figure

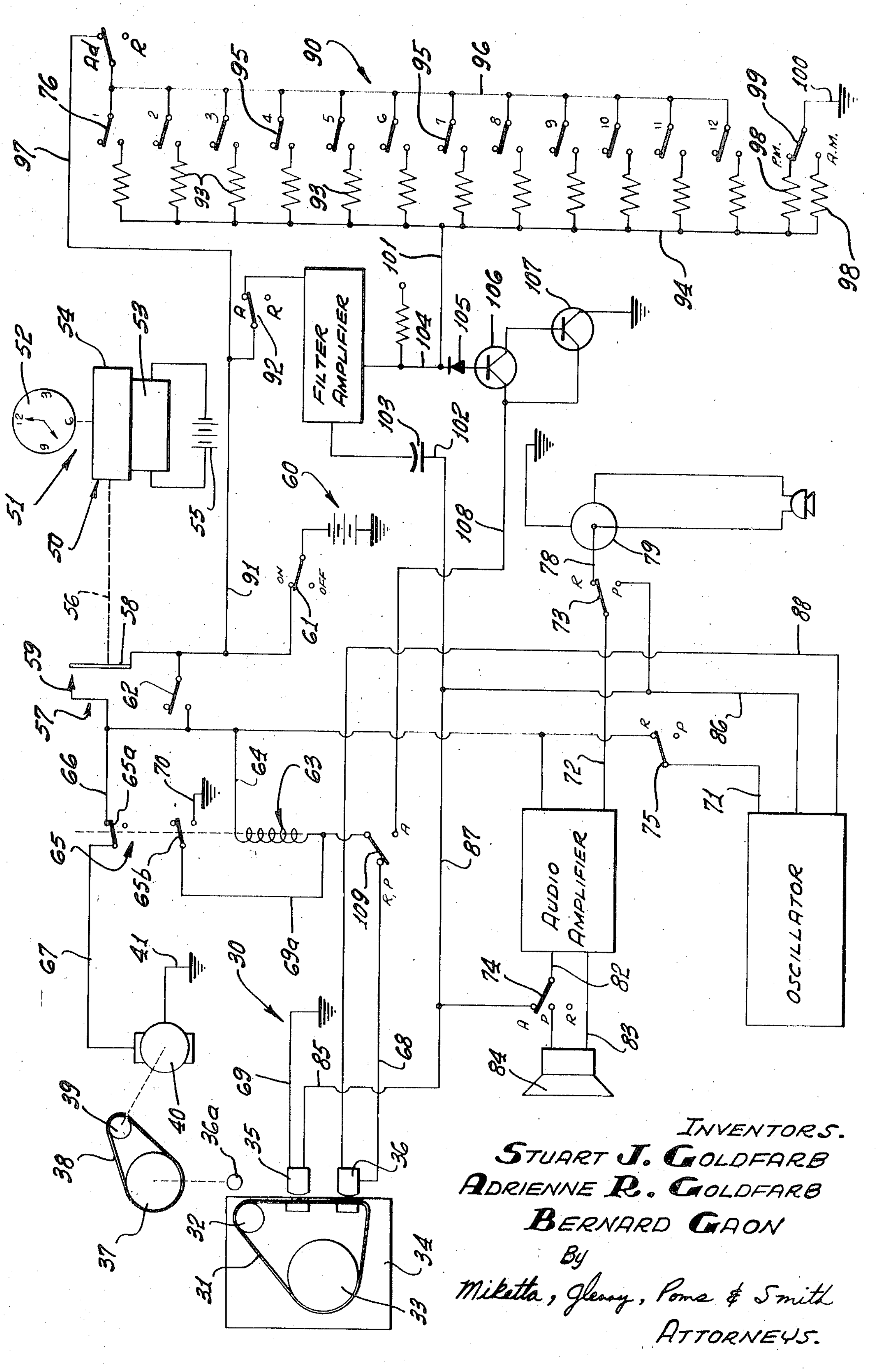
INVENTORS.
STUART J. GOLDFARB
ADRIENNE R. GOLDFARB
BERNARD GAON
By
Miketta, Glenny, Poms & Smith
ATTORNEYS.

PROGRAMMED TIME-RESPONSIVE AUDIO MESSAGE AND REMINDER DEVICE

BACKGROUND OF THE INVENTION

This invention generally relates to a message and reminder device which employs a programmed tape recorded in conjunction with an electric clock so that various messages prerecorded on the tape will be automatically delivered at various times during the day selected at the time the message is recorded. One object of the invention is to provide a device which presents an audio message or reminder, prerecorded on a tape recording and playback apparatus, at a preselected time of day. The device may be used to help blind persons to tell time by merely listening, as well as a general teaching device which may be used, for example, to teach children how to tell time. The device could also be used to provide bedtime stories for children or to present a religious, self-improvement, humorous, famous quote, or message to persons engaged in their normal daily activities.

SUMMARY OF THE INVENTION

Generally, the present invention provides a programmed, time-responsive, audio message and reminder device comprising a recording and playback device including erase and recording-playback heads, timing means for periodically operating the recording and playback device, and recording time selection means comprising means for selectively producing a bias voltage for a selected time of day, means including the tape of the recording and playback device for producing a tone corresponding to selected times of the day, means for producing a voltage corresponding to each tone, means for rapidly advancing the tape, means for stopping the tape when the bias voltage is in a predetermined relation to the tone voltage, and visual time identification means.

BRIEF DESCRIPTION OF THE DRAWING

The drawing shows an exemplary embodiment of a programmed time-responsive audio message and reminder device constructed in accordance with the present inventions.

BRIEF DESCRIPTION OF THE PREFERRED EMBODIMENT

Referring now to the FIGURE, there is shown an exemplary embodiment of a programmed time-responsive audio message and reminder device of the present invention. Such device generally comprises tape recording and playback means indicated generally at 30; timing means for selective periodic operation of the tape recording and playback means, indicated generally at 50; and recording time selection means, for selectively choosing the time at which a message or reminder is to be recorded.

The tape recording and playback means of the exemplary embodiment of the present invention comprises a continuous loop tape 31 mounted on reels 32, 33 rotatably supported by frame 34 in a manner well known in the art. Pickup heads, including recording head 35 and erase head 36, are diagrammatically shown and engage the tape 31 which may be driven at variable speeds through the provision of a two-speed capstan indicated at 36*a* mounted on a flywheel 37 driven by belt 38 operatively engaging a drive pulley 39 carried by the shaft of a motor 40 grounded at 41.

The timing means 50 of the exemplary embodiment provides selective periodic operation of the tape recording and playback means 30. Such timing means may include a conventional electric clock indicated generally at 51 having a face 52 for visual identification of the time, and driven by a motor 53 through a gearbox 54 connected to a power source 55, such as a battery. A shaft 56 is connected to the gearbox 54 and to a first contact switch, indicated generally at 57, including a movable element 58 and a stationary contact 59.

The main power source of the message and reminder device is illustrated at 60 comprising a battery connected to the circuit through a switch 61 for opening and closing the entire circuit. The ON contact of the switch 61 is connected to the contact element 58 of the timing switch. A bypass switch 62 is connected across the timing switch 57 for manual bypass thereof so that the recording and playback device may be operated independently of time. A relay 63 is connected to the power supply 60 through the bypass switch 62 and line 64 for operating a second, double-pole switch indicated generally at 65. When switch 65 is closed, that is, the relay 63 is not energized, one pole 65*a* connects the conductor 66 to a line 67 connected to motor 40 for operating the tape recording and playback device. The relay 63 stops the recording and playback device at the end of each message played and is energized by completing the relay circuit comprising the power supplied through line 64, and the return to ground via line 68, erase head 36, metallized conducting elements carried in spaced apart relation at the end of each message period by the tape 31, the record head 35, and line 69. In other words, the record and erase heads 35, 36 completes the relay circuit through the metallized elements of the recording tape 31 so as to act as a switch energizing the relay 63 each time a programmed message is completed at which point on the tape the metallized portion is secured. The other pole 65*b* on the double-pole switch 65 maintains the relay 63 closed when the relay circuit is completed as in the above-described manner. The second pole 65*b* is required because relay 63 is energized only momentarily by the metallized strip on the tape 31 as that portion of the tape passes the erase head 36 and recording head 35. Once the relay 63 is energized, it remains energized through conductor 69*a*, the second pole 65*b* of switch 65, and conductor 70 connected to ground, until the clock opens the first switch 57.

The tape recording and playback means also includes an audio amplifier circuit of a type well known in the art so that further description thereof is not required. The audio amplifier circuit is powered through conductor 72. The signal to be amplified by the audio amplifier circuit is fed through switch 73, manually controllable along with switches 74, 75 and 76 by a common shaft having three positions: Record, Play and Advance. When the switch 73 is positioned for Record, it is connected through lead 78 to a microphone jack 79. As will be explained more fully hereinafter, the audio amplifier thus functions to amplify the signals recorded through a microphone for the tape recording head. The switch 73 may also be set for Play so that the signal being sensed by recording head 35 is amplified by the audio amplifier circuit.

The output of the audio amplifier circuit is through leads 82, 83, the latter being connected directly to a loudspeaker 84 while the former lead is connected through the switch 74 so as to render the loudspeaker 84 operative when the common switch 73, 74, 75 and 76 is positioned for Play. When this multiple switch is positioned for Record, the audio amplifier circuit is connected for amplifying the signals picked up through the microphone attached to jack 79 and supplying such signals to the recording head 35. When positioned for Play, the loudspeaker 84 is attached to the audio amplifier circuit and will produce the desired messages or reminders as recorded on the tape recording and playback device.

Line 71 is connected from the power source through switches 61 and 57 through the switch 75 to the oscillator circuit. Switch 75 may be manually moved to the Record or Play positions and is closed when in the Record position. The oscillator circuit, of a type well known in the art, provides a bias voltage through lines 85, 86 and 87 to the recording head 35. The oscillator circuit has a second output through line 88 to the erase head 36. The oscillator circuit functions to bias the recording head 35 and to energize the erase head 36.

The device also includes means for recording messages at selected times which generally comprises means 90 for producing a bias voltage corresponding to a selected time of day, means including the tape 31 for producing a tone corresponding to a selected time of the day, means for producing a voltage corresponding to each tone received by the recording head from the tape 31, and means for stopping the tape when the bias voltage is a predetermined value relative to the tone voltage.

The means for selectively producing a bias voltage for each selected time of the day comprises the bias power source 60 attached through a conductor 91 through a switch 92 which may be positioned for Advance or Record. Switch 92 is made when positioned for Advance. The power source is then connected to a plurality of resistances, each of which is indicated by the reference numeral 93 and connected through a common conductor 94. Each of the resistors 93 has a switch, all of which are indicated at 95, through which they are connected to a common line 96 connected through switch 76 and lines 97 and 91 to power source 60. The conductor 94 is also connected to a pair of resistances each of which is indicated at 98, having different resistance values, and to a switch 99 to ground 100. When the switch 76 of the multiple switch is positioned to Advance, a bias voltage will be provided through an output lead 101 which will be dependent upon which of the switches 1 through 12, each of which corresponds to a particular hour on a clock, is depressed. The hour is chosen for p.m. or a.m. by properly setting switch 99 so as to change the voltage value selected by one of the switches 1 through 12 by a discrete amount which represents either p.m. or a.m.

The means carried by the tape 31 for producing a tone corresponding to a selected time of day comprises a second track on tape 31 having a plurality of tones programmed thereon which vary for each hour of a 24-hour day. When the tape recording device is operated at the higher speed, the playback head 35 will pick up the tone on the tape and transmit it to the filter amplifier circuit through lines 87 and 102 including capacitor 103. The output of the filter amplifier circuit is connected through line 104 to a diode 105 which rectifies the amplified tone. The rectified tone voltage is compared to the bias voltage in line 101 and when more negative causes transistors 106 and 107 to conduct bringing the voltage potential on line 108 to ground. When line 108 is brought to ground potential through the transistors 106, 107, relay 63 will engage causing the recording and playback means to stop since power is interrupted by second switch 65.

In operation, the device is used as follows. The manual multiple switch is positioned so as to move switches 73, 74, 75 and 76 to the Advance position. Suppose that the operator desires to record a message which is to be played back at 2:00 p.m. automatically. Switch 99 would then be set to p.m. and switch 2 which corresponds to 2:00 o'clock would be set. With the main power switch 61 ON, and bypass switch 62 positioned so as to short out the timer switch 57, the motor 40 will be operated to drive the reel 32 moving the tape 31. The tones on the second track of tape 31 will eventually produce a voltage which corresponds to 2:00 p.m. and which is sensed and transmitted to the filter amplifier circuit. The 2:00 p.m. tone voltage, after rectification, will be more negative than the bias voltage so as to turn on transistors 106, 107 so as to operate relay 63 to open switch 65 so as to stop motor 40 and the recorder.

The operator then turns the miltiple switch so as to move switches 72, 74, 75, 76 and 92 to Record. By plugging a microphone into jack 79 (a microphone may be built into the unit), a signal will be produced through line 78 and switch 73 to the audio amplifier circuit which will be fed through the output line 82 through switch 74 to the recording head 35 so as to impress such message upon the tape. When all switches are in the Record position, power is supplied to the recording device motor 40 through the bypass switch 62 until the allowable time for recorded message expires, at which time the metallized portion of tape 31 will complete the relay circuit and stop motor 40 through switch 65*a* of relay 63.

When all desired messages are recorded in the same above-described manner, (for the succeeding 24-hour day) the multiple switch is again returned to Advance and the tape recording and playback device is operated so as to return the tape to the correct time of the day. This is done by a visual indication of the clock face 52 to observe the time of day and depress the proper switch 95 which corresponds to such time. The multiple switch is then repositioned so that switches 73, 74 and 75 are returned to the Play position.

The device requires no further attention, and as the clock is driven through the motor 53 and gearbox 54, the shaft 56 will be rotated so as to close the switch 57, once each hour. It will of course be understood that while the exemplary embodiment is described as being operative on an hourly basis, any other selected time of day, such as a half hour or any fraction of an hour, may be chosen. Switch 57 will remain closed for a period of time such as a minimum of 30 seconds and a maximum of 2 minutes. Of course, this time period may be of any desired length in accordance with the length of the messages to be recorded on the device. However, such time period must be less than the time period selected for automatic closing of switch 57 through the time-indicating means 50. Closing of switch 57 will cause operation of motor 40, and through belt pulleys 37, 39 and belt 38, through shaft 36 and reels 32, 33, the tape will be driven. The recorded message, if any, at the particular time of the day will be picked up by head 35 and transmitted to the audio amplifier circuit and the loudspeaker 84 through lines 85, 87, and 72 through the audio amplifier circuit and through output leads 82, 83.

The tape 31 carries the metallized stop elements in a manner well known in the art, which are sensed through heads 35 and 36 so as to complete a circuit through switch 109 to the relay 63 to power source 60 so as to operate switch 65 thereby opening the circuit and turning off the motor 40. Such metallized portion of the tape can be silver paint or a piece of aluminum tape, applied in a manner well known in the art. The relay switch 65 is reset when the timing means switch 57 is reopened by the clock through shaft 56 because this deenergizes relay 63.

It will be appreciated that the metallized portions of the tape will assure that the tape was advanced the given precise amount each time the timing switch 57 is closed. Should the timing switch 57 itself, be relied upon to move the tape the specified distance forward, accuracy would depend upon the mechanical accuracy of maintaining the switch 57 in the open or closed position. Such mechanical accuracy is not sufficient to assure that the tape will be accurately positioned for the succeeding time period at which the switch 57 is closed. If only a mechanical switch was used, the tape 31 would soon become unsynchronized with the time of day because of the combination of the inertia effects of the tape, reels, etc., after the circuit is opened and because of the accuracy of the switch itself.

While the invention has been described in detail with particular reference to a preferred embodiment thereof, it should be understood that the particular circuit described and illustrated is only exemplary, and variations and modifications can be effected within the spirit and scope of the invention as above described and as defined in the appended claims.

We claim:

1. A programmed time-responsive audio message and reminder device comprising tape recording and playback means including recording-playback and erase heads, timing means for selective periodic operation of said tape recording and playback means comprising an electric clock, power source, output shaft, a first contact switch connected to said clock output shaft responsive to said clock, a second switch for electrically connecting said power source through said first switch to said tape recording and playback means when in a first position, and a relay circuit connected and controlling said second switch comprising a relay, said power source, said erase and record heads and metallized conducting elements on said tape for electrically disconnecting said power source in said tape recording and playback means in response to the position of said metallized elements on said tape, recording time selection means comprising means for selectively producing a bias voltage for any selected time of day comprising a power source, a plurality of selectively operable switch and resistance means connected in parallel, each of said last-named means representing an hour from 1 to 12, and a pair of selectively operable switch and resistance means connected in series with said hour selecting means, said pair of means representing a.m. or p.m., means including said tape for producing a tone corresponding to selected times of the day, means for producing a voltage corresponding to each tone, means for advancing said tape at a relatively rapid rate of speed, means for stopping said tape recording and playback means when said bias voltage substantially matches the tone voltage, and visual time identification means.

2. The audio message and reminder device of claim 1 wherein said means for producing a tone corresponding to selected time periods of the day includes a track on said tape programmed with varying tones, each of which corresponds to an hour of a day.

3. The audio message and reminder device of claim 1 wherein said means for producing a voltage corresponding to each tone comprises a filter amplifier circuit, said recording-playback and erase heads, and signal rectifying means.

4. The audio message and reminder device of claim 1 wherein said means for disconnecting said tape recording and playback means and said power source comprises a voltage comparison circuit connected to said bias voltage producing means and said means for producing a voltage corresponding to said programmed tones, and connected to said relay circuit controlling said second switch so as to stop said recording and playback means when the hour selected corresponds to the hour represented by a tone on said tape whereby a message or reminder may be recorded at that hour.

5. The audio message and reminder device of claim 1 wherein said second switch is a two-pole switch and a line is connected in parallel with said relay so as to maintain said relay energized and second switch closed until said first switch is opened by said clock output shaft.

* * * * *